(12) United States Patent
Bunce et al.

(10) Patent No.: US 6,490,868 B1
(45) Date of Patent: Dec. 10, 2002

(54) ADJUSTABLE MOUNTING DEVICE FOR ALIGNING OPTICAL SENSOR IN GAS TURBINE ENGINE COMBUSTOR

(75) Inventors: Richard Hobart Bunce, Altamonte Springs, FL (US); John Samuel Brushwood, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 43 days.

(21) Appl. No.: 09/640,074

(22) Filed: Aug. 17, 2000

(51) Int. Cl.[7] ................................................ F02C 7/00
(52) U.S. Cl. ..................... 60/803; 248/288.31; 403/122
(58) Field of Search ............................. 60/803; 356/43; 374/208; 403/122, 141, 142, 143; 248/288.31, 288.51

(56) References Cited

U.S. PATENT DOCUMENTS

| | | | |
|---|---|---|---|
| 4,416,553 A | * 11/1983 | Huebscher | 374/165 |
| 4,445,753 A | 5/1984 | Collignon | |
| 4,454,711 A | 6/1984 | Ben-Porat | |
| 4,515,336 A | * 5/1985 | Fischer | 248/288.31 |
| 4,903,476 A | 2/1990 | Steber et al. | |
| 5,090,654 A | 2/1992 | Ridings et al. | |
| 5,193,976 A | 3/1993 | Kolev et al. | |
| 5,564,664 A | * 10/1996 | Oschwald | 248/288.31 |
| 5,916,142 A | 6/1999 | Snyder et al. | |
| 5,943,713 A | 8/1999 | Patterson et al. | |

* cited by examiner

Primary Examiner—Louis J. Casaregola

(57) ABSTRACT

A mounting device for mounting an optical sensor to a combustor basket of a combustion gas turbine engine includes a base, an alignment member, and a clamp. The base is mounted over an access hole formed in the combustor basket and is formed with a spherical socket. The alignment member carries the optical sensor and includes a ball that is adjustably received in the socket. During alignment of the alignment member, a laser or other directed light source is applied to the end of the optical sensor. The laser delivers a laser beam that shines out of the optical sensor and permits the alignment member and the optical sensor to be properly aligned. The clamp selectively applies a non-rotational clamping force to the ball of the alignment member to clamp the alignment member in a given orientation with respect to the base. The clamp advantageously includes a tab formed with a compression ledge having at least a first protrusion that selectively and compressively engages the ball to non-movably retain the alignment member in a desired orientation with respect to the base.

14 Claims, 3 Drawing Sheets

ADJUSTABLE MOUNTING DEVICE FOR ALIGNING OPTICAL SENSOR IN GAS TURBINE ENGINE COMBUSTOR

BACKGROUND OF THE INVENTION

1. Technical Field

The present invention relates generally to combustion gas turbine engines and, more particularly, to optical sensors mounted on combustor baskets of combustion gas turbine engines for analyzing the efficiency thereof. Specifically, the present invention relates to an adjustable mounting device that adjustably mounts an optical sensor on a combustor basket of a combustion gas turbine engine.

2. Description of the Related Art

As is known in the relevant art, combustion gas turbine engines typically include a compressor region, a combustor region and a turbine region. Air is drawn into the engine and is compressed in the compressor region of the engine and delivered to the combustor region. The combustor region includes a pressurized plenum within which are disposed a plurality of combustor baskets, with each combustor basket being formed with a plurality of air inlet holes. The pressurized air travels from the compressor region, into the pressurized plenum, and through the air inlet holes into the combustor baskets where the compressed air is mixed with fuel and combusted. The combustion gases flow through the combustor basket into the turbine region of the engine where the high velocity combustion gases rotate one or more turbine stages that drive the compressor stages in the compressor region of the gas turbine engine.

To increase engine efficiency, it is preferred to closely monitor and control the combustion of the fuel/air mixture within the combustor baskets to achieve the highest and most advantageous combustion and energy from a given quantity of fuel. An optical sensor is mounted on the exterior of a combustor basket and is oriented to observe the combustion occurring within the combustor basket, with the signal from the optical sensor being delivered to appropriate analytical equipment for interpretation of the signal. While such optical sensor systems have been effective for their intended purposes, such optical sensor systems have not, however, been without limitation.

Such optical sensors are effective only if properly aimed at the combustion occurring within a specific downstream region of the combustor basket. Misalignment of the optical sensor can cause unintended signals to be received by the optical sensor, which can result in incorrect control and inefficient operation of the gas turbine engine. As such, it is preferred that the optical sensor be mounted on an adjustable fitting that permits the optical sensor to be positioned such that it is oriented toward a desired location within the combustor basket and is retained in such position during operation of the engine.

Proper alignment of an optical sensor is difficult to achieve inasmuch as the sensor must be positioned at a time when the engine is shut down. As such, it is necessary to understand the specific location in which the optical sensor is intended to point and to accurately orient the optical sensor in an appropriate orientation. It is thus preferred to provide a method for determining the specific orientation and observation point of the optical sensor when the engine is shut down.

Moreover, adjustable mounting devices that have been employed to mount such optical sensors have met with only limited success. Such mounting devices typically include a clamping system that limits the movement of an optical sensor once the optical sensor has been aligned in a given position. Such known clamping systems have, however, invariably at least nominally repositioned the optical sensors whenever a retention force is applied to the optical sensor. Such undesired repositioning results in misalignment of the optical sensor from the desired objective, which thus results in spurious optical signals that prevent proper analysis and control of the gas turbine engine. It is thus desired to provide a mounting device for an optical sensor that does not reposition the optical sensor during fixing of the optical sensor in a given position.

SUMMARY OF THE INVENTION

In view of the foregoing, a mounting device for mounting an optical sensor to a combustor basket of a combustion gas turbine engine includes a base, an alignment member, and a clamp. The base is mounted over an access hole formed in the combustor basket and is formed with a spherical socket. The alignment member carries the optical sensor and includes a ball that is adjustably received in the socket. During alignment of the alignment member, a directed beam of light such as a laser is applied to the flexible fiber-optic sensor mounted on the adjustable mounting device that ordinarily would be connected with the analytical equipment, whereby the laser emits a laser beam which is directed out of the optical sensor and into the combustor basket. The laser beam shining out of the optical sensor permits the alignment member and the optical sensor to be properly aligned.

The clamp selectively applies a non-rotational clamping force to the ball of the alignment member to clamp the alignment member in a given orientation with respect to the base. The clamp advantageously includes a tab formed with a compression ledge having at least a first protrusion that selectively and compressively engages the ball to non-movably retain the alignment member in a desired orientation with respect to the base. The tab includes an elongated clamping opening along which the compression ledge is formed, and further includes an elongated fastener opening that at least partially receives a threaded bolt therein. The tab is also formed with a pair of prongs that are movably received in a slot formed in the base. The elongated fastener and clamping openings, as well as the movable relationship of the prongs within the slot permit the tab and thus the alignment member and the optical sensor to be adjusted, yet permit the alignment member to be non-movably retained in a given orientation once the given orientation has been achieved.

In view of the foregoing, an aspect of the present invention is to provide a mounting device for adjustably retaining an optical sensor on a combustor basket of a gas turbine engine, the general nature of which can be stated as including a base structured to be mounted on the combustor basket, the base being formed with a socket, an alignment member formed with a ball, the ball being adjustably received in the socket, the alignment member being structured to carry the optical sensor, and a clamp mounted on the base, the clamp being structured to apply a non-rotational clamping force to the alignment member to clamp the alignment member in a given orientation with respect to the base.

Another aspect of the present invention is to provide a method of adjustably retaining an optical sensor on a combustor basket of a gas turbine engine, the general nature of which can be stated as including the steps of placing the optical sensor in an alignment member having a ball, positioning the alignment member in a given orientation with respect to a base, the base being disposed on the combustor basket and having a socket for receiving the ball of the alignment member, and applying a non-rotational clamping force to the alignment member.

Still another aspect of the present invention is to provide a method of aligning an optical sensor mounted on a combustor basket of a gas turbine engine, the general nature of which can be stated as including the steps of operatively connecting a light source to the optical sensor, generating a beam of light with the light source, projecting the beam of light out of the optical sensor, and positioning the optical sensor such that the beam of light is directed in a given orientation.

Again still another aspect of the present invention is to provide a turbine engine, the general nature of which can be stated as including a compressor section, a combustor section, and a turbine section, the combustor section including at least a first combustor basket, a base structured to be mounted on the combustor basket, the base being formed with a socket, an alignment member formed with a ball, the ball being adjustably received in the socket, an optical sensor mounted on the alignment member, and a clamp mounted on the base, the clamp being structured to apply a non-rotational clamping force to the alignment member to clamp the alignment member in a given orientation with respect to the base.

BRIEF DESCRIPTION OF THE DRAWINGS

The preferred embodiment of the invention, illustrative of the best mode in which Applicant has contemplated applying the principles of the invention, is set forth in the following description and is shown in the drawings and is particularly and distinctly pointed out and set forth in the appended Claims.

Similar numerals refer similar parts throughout the specification.

DESCRIPTION OF THE PREFERRED EMBODIMENT

Figure 1:
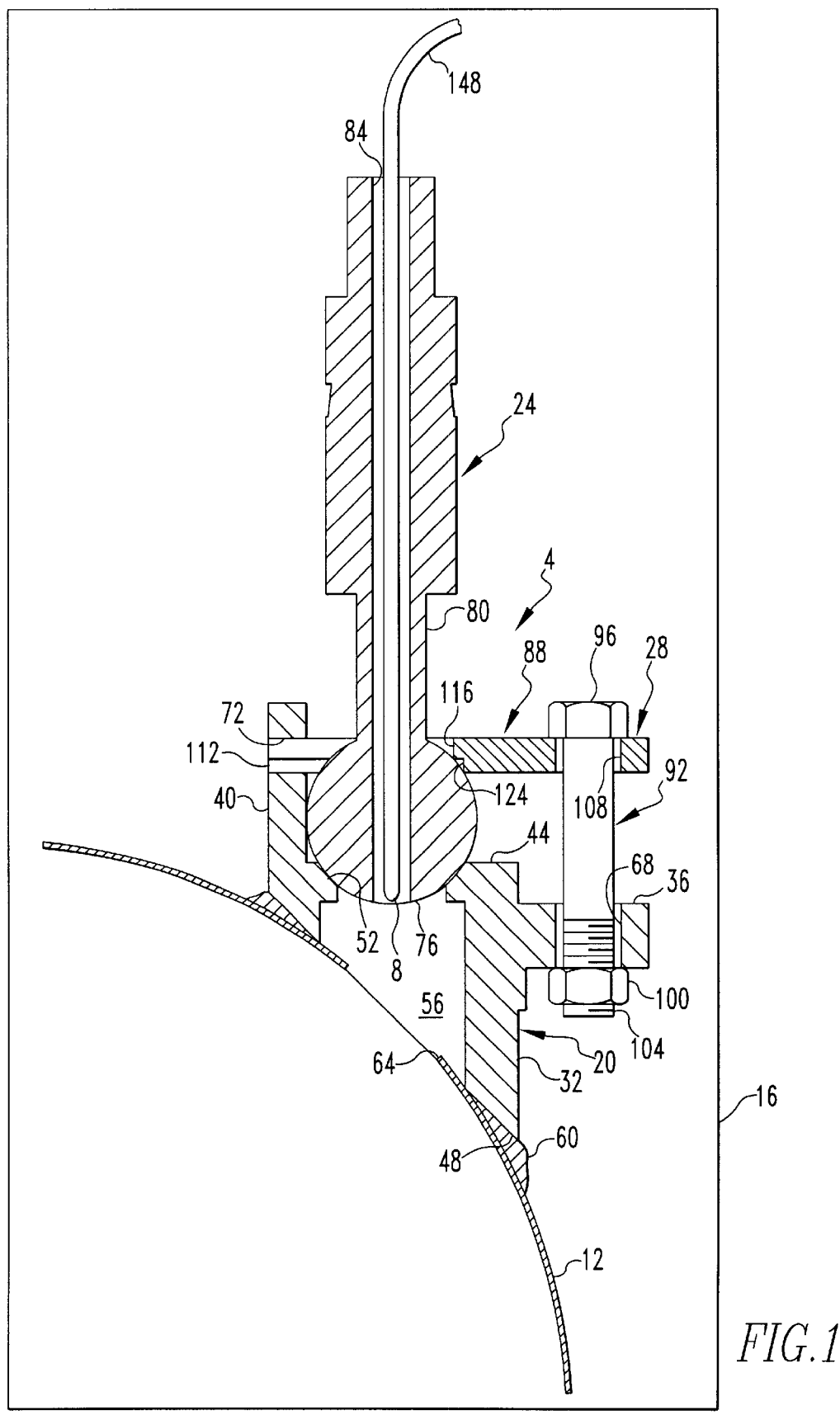
FIG. 1 is a side elevational view, partially cut away, of a mounting device in accordance with the present invention.

A mounting device in accordance with the present invention is indicated generally at the numeral 4 in FIG. 1. The mounting device 4 is employed to adjustably mount and retain an optical sensor 8 on a combustion gas turbine engine 16.

Figure 7:
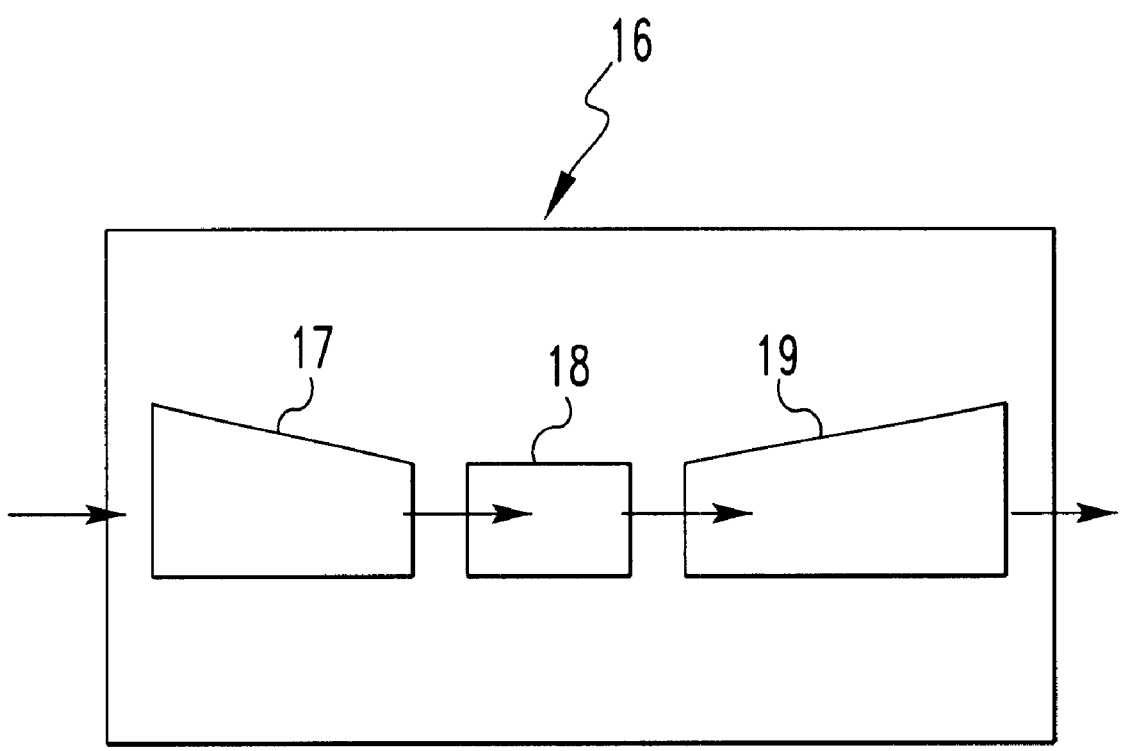
FIG. 7 is a schematic view of a combustion gas turbine engine into which the present invention can be incorporated.

More specifically, and as is depicted schematically in FIG. 7, the combustion gas turbine engine 16 includes a compressor section 17, a combustor section 18, and a turbine section 19 through which large quantities of air serially flow, as is indicated generally by the arrows in FIG. 7. The combustor section 18 typically includes a plurality of combustor baskets 12, and the mounting device 4 mounts the optical sensor 8 on one of the combustor baskets 12 (FIG. 1). The mounting device 4 adjustably retains the optical sensor 8 in a desired position for observation of the combustion occurring within the combustor basket 12 during operation of the gas turbine engine 16.

The mounting device 4 includes a base 20, an alignment member 24, and a clamp 28. As will be set more fully below, the base is mounted on the combustor basket 12, and the clamp 28 selectively retains the alignment member 24 in a given position with respect to the base 20.

Figure 2:
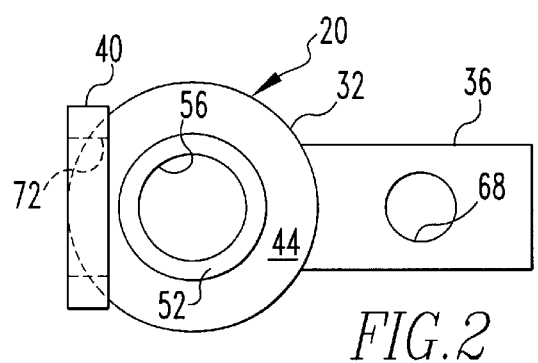
FIG. 2 is a top plan view of a base of the present invention.

The base 20 includes a table 32, a lug 36, and a retention plate 40. As is best shown in FIGS. 1 and 2, the table 32 has a roughly circular cross-section and includes a substantially planar upper surface 44 and a substantially planar lower surface 48, the upper and lower surfaces 44 and 48 being generally non-parallel with one another. As is known in the relevant art, the combustor basket 12 is an elongated hollow cylindrical member having a spherical dome at one end thereof. The mounting device 4 is not disposed at the apex of the spherical dome, and thus the lower surface 48 is non-parallel with the upper surface 48 to compensate for the non-apex placement of the mounting device 4.

It is understood, however, that the combustor basket 12 depicted in FIG. 1 is provided merely as an example of one type of combustor basket, and that other combustor baskets 12 may be of different configurations. It is further understood that the mounting device 4 may be disposed at different locations on the combustor basket 12 than that depicted generally in FIG. 1. As such, the base 20 may correspondingly be of different configurations, and the upper and lower surfaces 44 and 48 likewise may have different orientations with respect to one another without departing from the present invention.

A spherical socket 52 is formed in the otherwise planar upper surface 44, and a viewing hole 56 extends through the table 32 from the socket 52 to the lower surface 48. While the viewing hole 56 is of a substantially circular cross-section across much of its length, it is understood that the viewing hole can be of numerous configurations so long as it extends from the socket 52 through the table 32 to the lower surface 48.

As can be seen in FIG. 1, the base 20 is mounted on the spherical end of the combustor basket 12 with at least first weld 60 extending therebetween, with the viewing hole 56 of the table 32 being substantially aligned with an access hole 64 formed in the dome of the combustor basket 12. The alignment of the viewing hole 56 with the access hole 64 permits the viewing hole 56 to be substantially in visual communication with the interior of the combustor basket 12.

As is shown in FIG. 2, the lug 36 extends radially outwardly from the arcuate outer surface of the table 32 and is of a substantially rectangular cross-section. The lug 36 is formed with a cylindrical lug hole 68 extending therethrough in a direction substantially perpendicular to the upper surface 44.

The retention plate 40 is a generally rectangular solid member extending upwardly from the upper surface 44 of the table 32. The retention plate 40 is formed with a slot 72 having a substantially rectangular cross-section and extending therethrough.

The alignment member 24 includes a substantially spherical ball 76 and an elongated adjustment shank 80 connected with one another. A substantially cylindrical thru bore 84 extends through the ball 76 and adjustment shank 80, the thru bore 84 being sized to at least partially receive the optical sensor 8 therein. The end of the adjustment shank 80 opposite the ball 76 is preferably threaded to receive a standard fiber optic fitting.

As can be seen in FIG. 1, the ball 76 is configured to be adjustably and slidably received in the socket 52 formed in the upper surface 44. The socket 52 thus serves as a seat for receiving the ball 76.

The clamp 28 includes a tab 88 and a fastening member 92. In the embodiment depicted here, the fastening member 92 is a bolt 96 and a nut 100, the bolt 96 being formed with a plurality of threads 104, the bolt 96 cooperating threadably with the nut 100.

While the bolt 96 is depicted in FIG. 1 as being a convention bolt having a hexagonal head with six external flats, the bolt 96 preferably is an internally-wrenching fastener such as a hex head cap screw to minimize scuffing of the tab 88. The nut 100 is preferably a slotted nut that resists unintentional loosening from the bolt 96. The fastening member 92 can additionally or alternatively include other locking structures such as lock washers and the like to retain the nut 100 in a given position with respect to the bolt 96.

Figure 4:
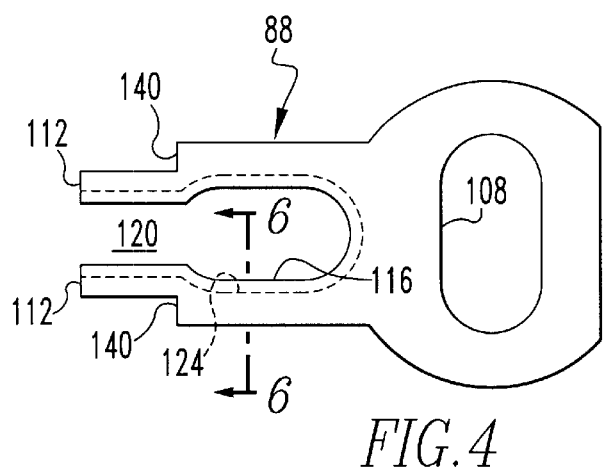
FIG. 4 is a top plan view of a tab of the present invention connected to a laser.
Figure 5:
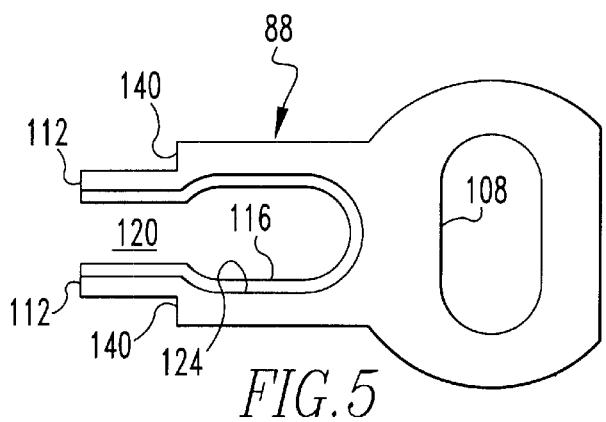
FIG. 5 is a bottom view of a tab of the present invention.

As is best shown in FIGS. 4 and 5, the tab 88 is a generally planar plate of material formed with an elongated fastener opening 108 and an elongated clamping opening 116. The fastener opening receives the bolt 96 therethrough, and the clamping opening receives the alignment member 24 therethrough.

The fastener opening 108 is disposed adjacent a first end of the tab 88. The clamping opening 116 extends from approximately the midpoint of the tab 88 and extends to a second opposite end thereof, the clamping opening 116 thus defining a pair of prongs 112 protruding from the second end of the tab 88. The elongated dimension of the clamping opening 116 is oriented substantially perpendicular to the elongated dimension of the fastener opening 108.

The clamping opening 116 can be seen to include a relatively narrower clearance opening 120 between the prongs 112. The clearance opening 120 is sufficiently wide to at least receive the adjustment shank 80 therethrough during installation and disassembly of the mounting device 4. The relative narrowing of the clearance opening 120 in comparison with the remainder of the clamping opening 116 results from a desire to make the prongs 112 as strong as possible, and from the understanding that it is necessary only to provide sufficient clearance to permit installation of the alignment member 24 into the clamping opening 116 and removal therefrom. In this regard, the clamping opening can alternatively be generally U-shaped and not including the relatively narrowed clearance opening 120 without departing from the present invention.

Figure 6:
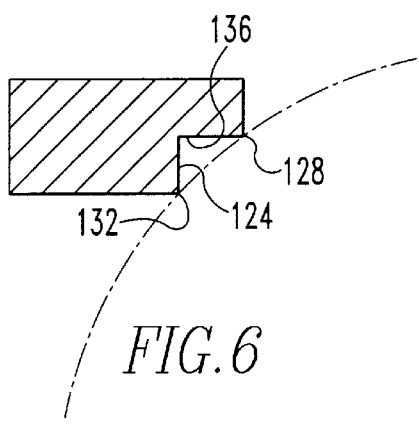
FIG. 6 is a sectional view as taken along the line 6—6 of FIG. 4.

A compression ledge 124 is formed along at least the clamping opening 116, as is best shown in FIGS. 5 and 6. The compression ledge 124 is a ledge formed along the clamping opening 116 to provide a first protrusion 128 and a second protrusion 132 that are separated by a relief channel 136. As is best shown in FIG. 6, the compression ledge 124 is configured such that the first and second protrusions 128 and 132 are compressively engageable with the spherical surface of the ball 76 substantially opposite the socket 52. While the compression ledge 124 is depicted herein as extending along the prongs 112 adjacent the clearance opening 120, it is understood that the compression ledge 124 can be formed solely along the clamping opening 116 without departing from the spirit of the present invention.

The prongs 112 extend substantially parallel with one another and are configured to be slidingly and adjustably received in the slot 72 formed in the retention plate 40. It can be seen that the prongs 112 are longer than the thickness of the retention plate 40, and thus the depth of the slot 72. As such, the tab 88 can be disposed in numerous positions longitudinally with the prongs 112 at least partially received in the slot 72 before the retention surfaces 140 that extend perpendicularly outwardly from the bases of the prongs 112 abut the retention plate 40.

As is best shown in FIG. 1, the mounting device 4 is assembled by receiving the ball 76 in the socket 52, positioning the prongs 112 in the slot 72 with the adjustment shank 80 received in the clamping opening 116 and with the bolt 96 received in both the fastener opening 108 of the tab 88 and the lug hole 68 of the lug 36, and with the nut 100 being threadably received on the end of the bolt 96 and disposed adjacent the underside of the lug 36. The base 20 is attached to the dome of the combustor basket 12 in alignment with the access hole 64 via the weld 60. It is understood, however, that the access hole 64 may be formed in a part of the combustor basket 12 other than the dome, with the base 20 being accordingly attached thereat.

Figure 3:
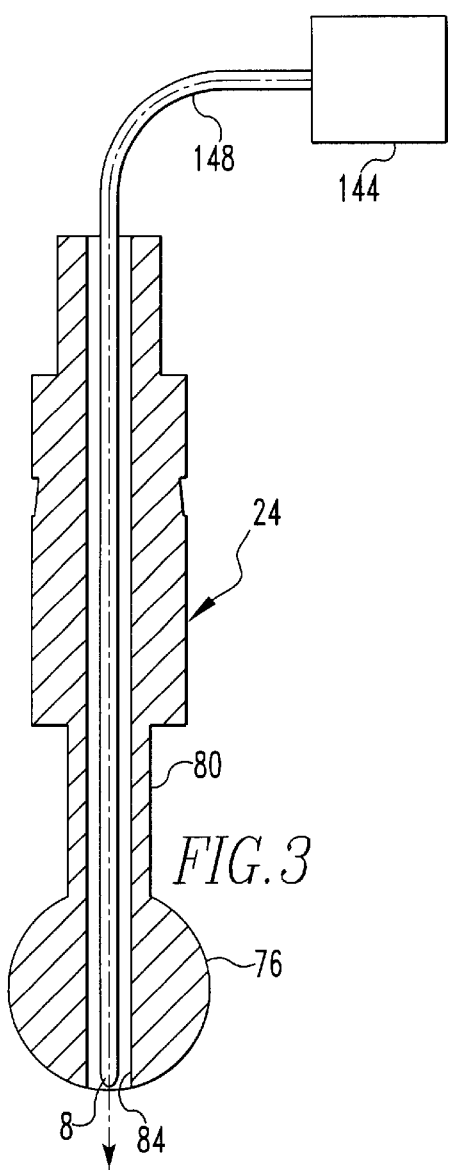
FIG. 3 is a front elevational view, partially cut away, of an alignment member of the present invention connected to a laser.

The optical sensor 8 is aligned by connecting a laser 144 to the lead 148 that flexibly extends from the optical sensor 8 (FIG. 3). As is known in the relevant art, the lead 148 ordinarily is connected with the analytical equipment that interprets the optical signals received by the optical sensor 8 and delivered by the lead 148. The laser 144 is a light source that emits a beam of laser light that is carried by the lead 148 and is directed out of the optical sensor 8. When the optical sensor 8 is mounted on the alignment member 24, and the alignment member 24 is mounted on the base 20, as set forth above, the laser beam delivered by the laser 144 shines outwardly from the optical sensor 8, and is directed through the thru bore 84 and extends into the combustor basket 12 to indicate the direction in which the alignment member 24 is pointing.

While the optical sensor 8 is depicted in FIGS. 1 and 3 as being disposed within substantially the entire longitudinal extent of the thru bore 84, it is understood that in other applications the optical sensor 8 may itself be disposed only partially or not at all within the thru bore 84. In such applications, the beam delivered by the laser 144 would travel through the portions of the thru bore 84 not occupied by the optical sensor 8.

The alignment member 24 is adjusted by slidingly adjusting the ball 76 on the seat formed by the socket 52 until the precise orientation of the alignment member 24 is achieved. Such orientation is advantageously indicated by the laser beam within the combustor basket 12 that shines in the precise direction that is desired to be observed by the optical sensor 8. While it is preferred to direct the resultant laser beam as far as possible along the combustor basket 12 and away from the walls of the combustor basket 12 to minimize unintended signals, it is understood that the proper alignment of the optical sensor 8 is dependant upon the specific needs of the particular application.

With regard to adjustment of the alignment member 24, it can be seen from FIGS. 4 and 5 that the clamping opening 116 is oriented such that the elongated dimension thereof is oriented substantially parallel with the directions in which the prongs 112 extend. Similarly, it can be seen that the elongated dimension of the fastener opening 108 is oriented substantially perpendicular with that of the clamping opening 116. In this regard, it can be seen that when the mounting device 4 is assembled as shown in FIG. 1, the tab 88 is at least nominally rotatable within its own plane, whereby the position of the tab 88 can be adjusted with respect to the bolt 96 due to the elongated nature of the fastener opening 108 permitting adjustment therebetween. At least a nominal clearance preferably exists between the slot 72 and the prongs 112 to permit rotation of the tab within its own plane and within the limits of adjustability of the bolt 96 within the fastener opening 108. As such, the alignment member 24 can be pivoted on the ball 76 in conjunction with pivoting movement of the tab 88 in a direction generally parallel with the elongated axis of the fastener opening 108.

Similarly, the elongated clamping opening 116 permits the alignment member 24 to be pivoted on the ball 76 in a direction perpendicular with the elongated axis of the clamping opening 116, which direction is substantially perpendicular with that of the fastener opening 108. The combined allowance of movement in perpendicular directions thus permits the alignment member 24 to be continuously adjusted within the limits of the fastener and clamping openings 108 and 116.

When the desired orientation of the alignment member 24 is achieved, the nut 100 is tightened on the bolt 96, until the tab 88 compressively retains the ball 76 in the desired position in the socket 52. In this regard, it can be seen that in tightening the nut 100 with respect to the bolt 96, the fastening member 92 applies a fastening force to the first end of the tab. Simultaneously therewith, the compression ledge 124 applies a non-rotational clamping force to the ball 76, and the prongs apply a resultant force to the retention plate 40 of the base 20. In applying the non-rotational clamping force to the ball 76, the first and second protrusions 128 and 132 compressively engage the ball 76 and compress the ball 76 into the socket 52. The compression of the ball 76 into the correspondingly formed socket 52 increases the friction therebetween, thus resisting inappropriate and undesired repositioning of the alignment member 24 during tightening. Moreover, the compressive engagement of the first and second protrusions 128 and 132 with the ball 76 at least nominally deforms the ball 76 along the first and second protrusions 128 and 132.

Such deformation may be either elastic or plastic without affecting the utility or adjustability of the mounting device 4. In this regard, it can be seen that the only portions of the ball 76 received in the socket 52 are those portions of the ball 76 opposite the region of juncture between the ball 76 and the adjustment shank 80. Similarly, the compression ledge 124 engages only those portions of the ball 76 adjacent its juncture with the adjustment shank 80. As such, any plastic deformation of the ball 76 by the first and second protrusions 128 and 132 will occur at regions thereof that are not received in and do not engage the socket 52. Plastic deformations in the ball 76 caused by the first and second protrusions 128 and 132 thus will not interfere with the sliding of the ball 76 within the socket 52 or the compressive engagement therebetween.

Furthermore, the deformation lines along which the first and second protrusions 128 and 132 engage the ball 76 further resists inappropriate and unwanted readjustment of the alignment member 24 with respect to the base 20 during tightening of the nut 100 with respect to the bolt 96. In this regard, it can be seen that upon tightening the nut 100 with respect to the bolt 96, the fastener member applies a compressive fastening force to the first end of the tab 88, and any rotative force or torque that potentially might be supplied by the bolt 96 during rotation thereof are applied solely to the first end of the tab 88 with a reaction at the retention plate 40 of the base 20. Any such torques thus are not applied to the alignment member 24. As such, tightening of the nut 100 and bolt 96 results in solely a non-rotational clamping force being applied to the ball 76 of the alignment member 24.

In this regard, it is further understood that the "non-rotational" nature of the clamping force refers to any type of rotation or translation of the tab 88 within its plane. Inasmuch as the tab 88 will at least nominally deflect in response to the fastening force applied thereto, such flexing does not impart any meaningful rotative force to the ball 76. As such, compression of the tab 88 against the ball 76 of the alignment member 24 results solely in a non-rotational clamping force that resists any type of unintentional and inappropriate repositioning or realignment of the alignment member 24 during tightening.

Due to the high temperature application in which the mounting device 4 is used, it is most preferred that the mounting device be manufactured out of a high temperature alloy such as Hastelloy manufactured by Haynes International, Inc., of Kokomo, Ind., USA, although other appropriate materials may be used without departing from the spirit of the present invention. It is further understood that while the fastening member 92 is depicted herein as including the bolt 96 and the nut 100, it is understood that the fastening member 92 may be of other configurations without departing from the spirit of the present invention. Such alternate configurations for the fastening member 92 may include a bayonet-type fastener or other such releasable fasteners.

The laser 144 connected with the lead 148 of the optical sensor 8 permits the optical sensor 8 to be properly aligned when the engine 16 is shut down. The mounting device 4 is advantageously configured to permit the alignment member 24 to be positioned to achieve the desired alignment of the optical sensor prior to tightening of the fastening member 92. The mounting device 4 of the present invention permits a non-rotational clamping force to be applied to the ball 76 of the alignment member 24 to retain the alignment member 24 in a given position without undesired or inappropriate repositioning thereof when the fastening member 92 is tightened.

While a particular embodiment of the present invention has been described herein, it is understood that various changes, additions, modifications, and adaptations may be made without departing from the scope of the present invention as set forth in the following Claims.

What is claimed is:

1. A mounting device for adjustably retaining an optical sensor on a combustor basket of a gas turbine engine, the mounting device comprising:
   a base structured to be mounted on the combustor basket, the base being formed with a socket;
   an alignment member formed with a ball, the ball being adjustably received in the socket, the alignment member being structured to carry the optical sensor, and
   a clamp mounted on the base, the clamp being structured to apply a non-rotational clamping force to the alignment member to clamp the alignment member in a given orientation with respect to the base;
   in which the base includes an upper surface and a lower surface, the socket being formed in the upper surface, the lower surface being non-parallel with the upper surface.

2. The mounting device as set forth in claim 1, in which the base is formed with a viewing hole extending therethrough from the socket to the lower surface.

3. A mounting device for adjustably retaining an optical sensor on a combustor basket of a gas turbine engine, the mounting device comprising:
- a base structured to be mounted on the combustor basket, the base being formed with a socket,
- an alignment member formed with a ball, the ball being adjustably received in the socket, the alignment member being structured to carry the optical sensor; and
- a clamp mounted on the base, the clamp being structured to apply a non-rotational clamping force to the alignment member to clamp the alignment member in a given orientation with respect to the base;
- in which one of the clamp and the base includes a compression ledge that is compressively engageable with the ball, the compression ledge including at least a first protrusion.

4. The mounting device as set forth in claim 3, in which the clamp includes a tab and a fastening member, the fastening member being structured to apply a fastening force to the tab, the tab being structured to apply the non-rotational clamping force to the alignment member.

5. The mounting device as set forth in claim 4, in which the compression ledge is disposed on the tab, the compression ledge further including a second protrusion and a relief channel extending between the at least first and second protrusions.

6. The mounting device as set forth in claim 5, in which the tab is formed with a first opening, the compression ledge being formed on the tab at least partially around the first opening.

7. The mounting device as set forth in claim 6, in which the tab includes a first end and a second end, the first and second ends being opposite one another, the first end being structured to be subject to the fastening force, the second end being structured to deliver a resultant force to the base, the first opening being disposed substantially between the first and second ends.

8. The mounting device as set forth in claim 4, in which the base is formed with a slot, and in which the tab includes a first end and a second end, the first end being structured to be subject to the fastening force, the second end of the tab being at least partially received in the slot.

9. The mounting device as set forth in claim 8, in which the second end of the tab is adjustably received in the slot, and in which one of the tab and the base is formed with an elongated fastener opening, the fastening member being at least partially received in the fastener opening.

10. The mounting device as set forth in claim 9, in which the elongated fastener opening is formed on the tab adjacent the first end, and in which the tab is formed with an elongated clamping opening, the region of the tab adjacent clamping opening being structured to apply the non-rotational clamping force to the alignment member.

11. The mounting device as set forth in claim 10, in which the alignment member includes an adjustment shank extending from the ball, the adjustment shank being at least partially received through the clamping opening.

12. The mounting device as set forth in claim 11, in which second end includes a pair of prongs, and in which the second end is formed with clearance opening interposed between the pair of prongs, the clamping opening being in communication with the clearance opening.

13. The mounting device as set forth in claim 10, in which the fastening member is threaded and operatively extends between the base and the tab.

14. A turbine engine comprising:
- a compressor section;
- a combustor section; and
- a turbine section;
- the combustor section including at least a first combustor basket;
- a base structured to be mounted on the combustor basket, the base being formed with a socket;
- an alignment member formed with a ball, the ball being adjustably received in the socket
- an optical sensor mounted on the alignment member; and
- a clamp mounted on the base, the clamp being structured to apply a non-rotational clamping force to the alignment member to clamp the alignment member in a given orientation with respect to the base.

* * * * *